(12) United States Patent
Park

(10) Patent No.: US 9,694,641 B2
(45) Date of Patent: Jul. 4, 2017

(54) ELECTRIC POWER GENERATING APPARATUS USING SUSPENSION DEVICE

(71) Applicant: HYUNDAI MOBIS CO., Ltd, Seoul (KR)

(72) Inventor: Kyung Ryul Park, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 14/925,112

(22) Filed: Oct. 28, 2015

(65) Prior Publication Data

US 2016/0121683 A1 May 5, 2016

(30) Foreign Application Priority Data

Oct. 31, 2014 (KR) ........................ 10-2014-0150197

(51) Int. Cl.
| | |
|---|---|
| *B60G 13/14* | (2006.01) |
| *B60G 13/08* | (2006.01) |
| *B60G 17/08* | (2006.01) |
| *B60G 13/18* | (2006.01) |
| *F16F 9/10* | (2006.01) |

(52) U.S. Cl.
CPC ............. *B60G 13/14* (2013.01); *B60G 13/08* (2013.01); *B60G 13/18* (2013.01); *B60G 17/08* (2013.01); *F16F 9/10* (2013.01); *B60G 2300/60* (2013.01)

(58) Field of Classification Search
CPC .......... B60G 13/14; B60G 13/08; B60G 17/08
See application file for complete search history.

(56) References Cited

U.S. PATENT DOCUMENTS

| | | | | |
|---|---|---|---|---|
| 5,636,601 A | * | 6/1997 | Moriya | ..................... F01L 9/04 123/90.11 |
| 2004/0149944 A1 | * | 8/2004 | Hopper | ..................... F01L 9/04 251/54 |
| 2007/0051910 A1 | * | 3/2007 | Kimura | ................ B41J 2/17509 251/65 |
| 2007/0085247 A1 | * | 4/2007 | Beck | ..................... B60G 17/044 267/64.17 |
| 2014/0091539 A1 | * | 4/2014 | Tominaga | .............. B62K 25/26 280/6.157 |
| 2014/0244112 A1 | * | 8/2014 | Dunaway | ............... B60G 13/00 701/37 |
| 2014/0288776 A1 | * | 9/2014 | Anderson | ............ B60G 17/016 701/37 |

FOREIGN PATENT DOCUMENTS

KR    10-2009-0128822 A    12/2009

\* cited by examiner

*Primary Examiner* — Vishal Sahni
(74) *Attorney, Agent, or Firm* — NSIP Law

(57) ABSTRACT

In an electric power generating apparatus using a suspension device according to an embodiment of the present invention, provided is a valve structure for partially disconnecting a suspension device (or a damper) from an energy recovery device (or a turbine unit) when a vehicle is driving on an under-construction road or an unpaved road from which a large bump is expected.

6 Claims, 6 Drawing Sheets

110: 112,114,116
120: 121,123,125,127,129

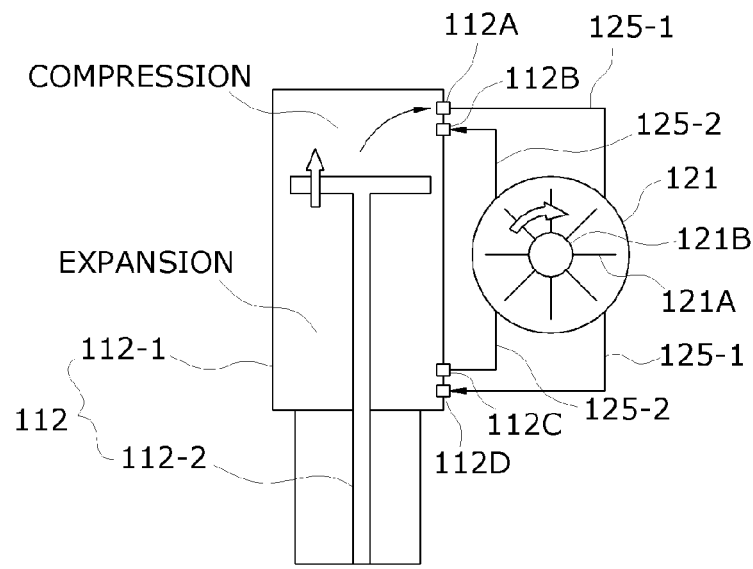
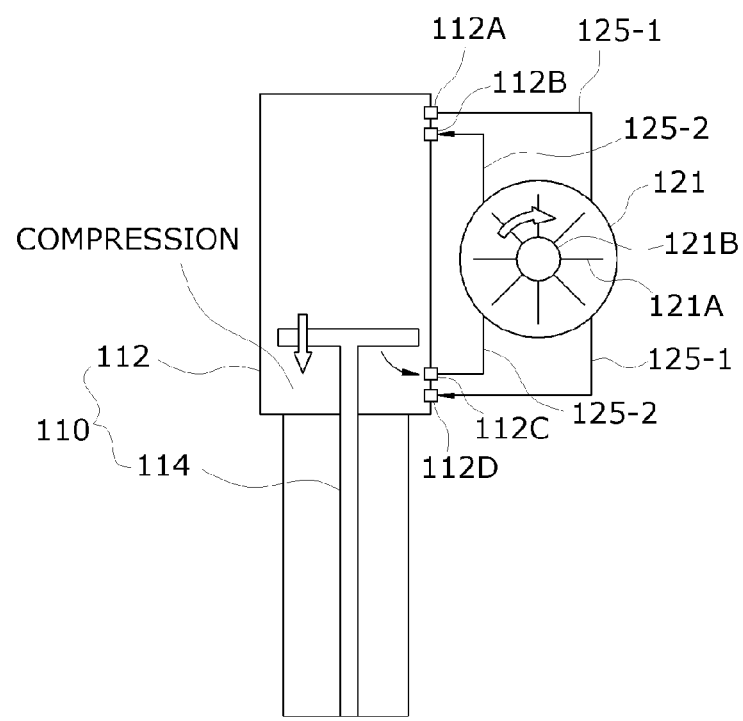

130: 131,133,135

FIG. 5A
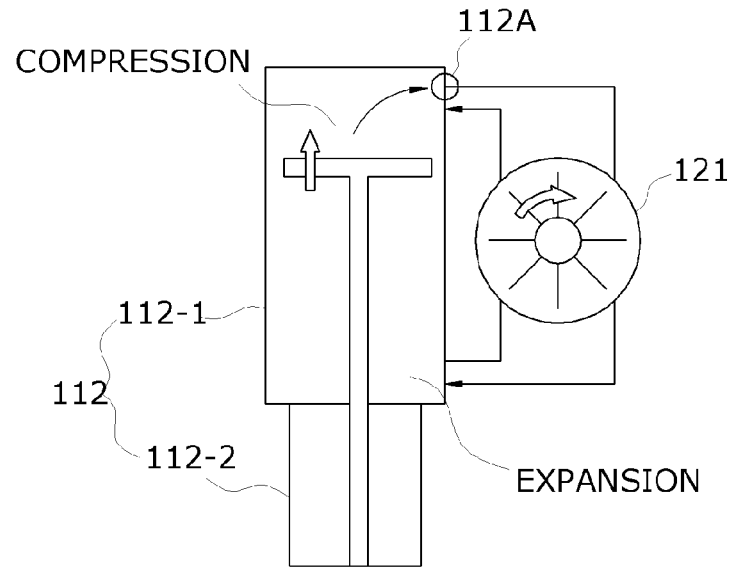
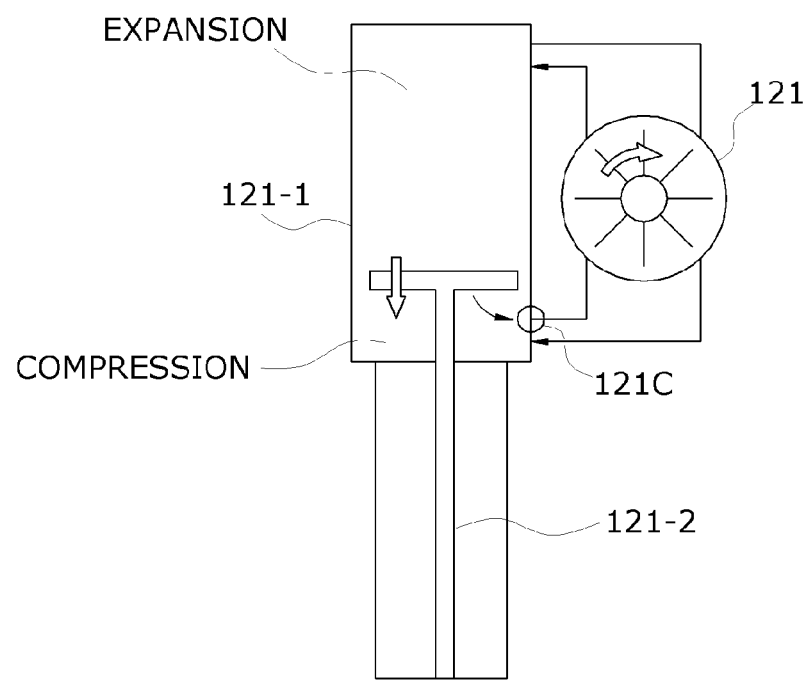

FIG. 5B
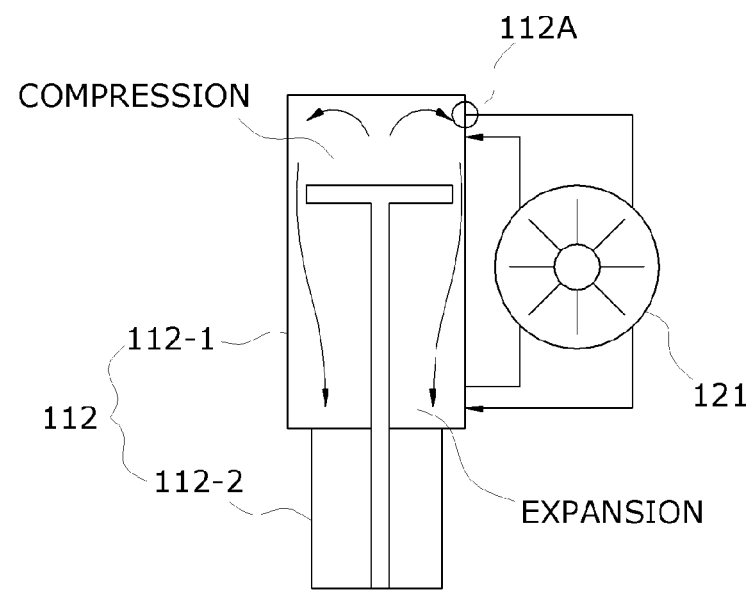
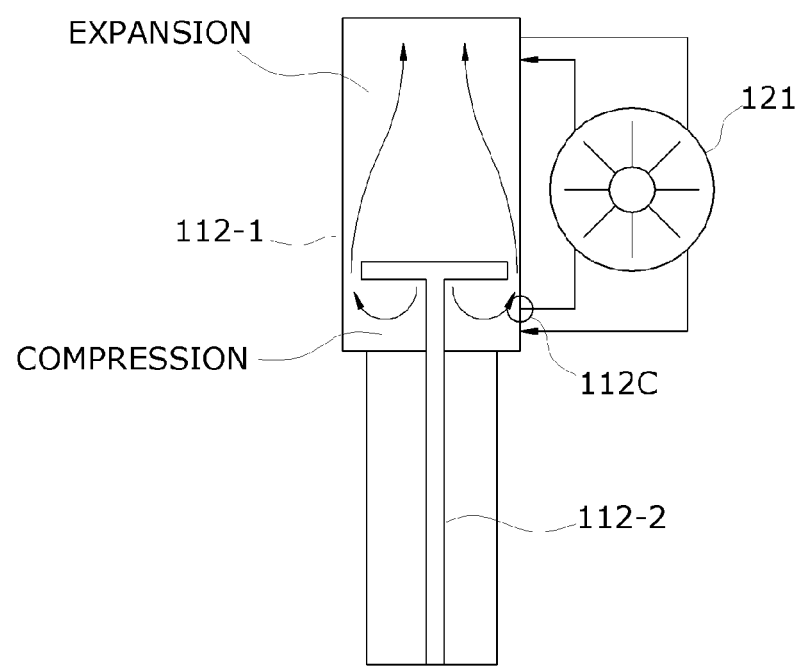

ELECTRIC POWER GENERATING APPARATUS USING SUSPENSION DEVICE

CROSS-REFERENCE TO RELATED APPLICATIONS

This application claims priority under 35 U.S.C. §119 to Korean Patent Application No. 10-2014-0150197, filed on Oct. 31, 2014, the disclosure of which is incorporated herein by reference in its entirety.

TECHNICAL FIELD

The present invention relates to an electric power generating apparatus, and more particularly, to an electric power generating apparatus connected to a suspension device of a vehicle.

BACKGROUND

Suspension devices each include a spring, a damper (or a shock absorber), and a stabilizer bar. The suspension devices are devices that provide good ride quality and stability by performing three functions, for example, a function of adjusting a spring constant, a function of adjusting a damping force (or an attenuating force), and a function of adjusting a vehicle height level.

The damper includes a piston assembly that forms a circulation path for internally circulating oil filled therein upward and downward. The damper absorbs and buffers shock and vibration applied to a vehicle.

Recently, technology for connecting a suspension device to an electric power generating apparatus in addition to simply improving the ride quality and stability of a vehicle has been developed. As an example of the technology, an electric power apparatus using a suspension device is disclosed in Korean Patent Publication No. 2009-0128822 (hereinafter referred to as the prior art reference).

The prior art reference discloses a technical configuration where a damper configuring a suspension device is connected to an energy recovery device such as a turbine means through a tube, a piston provided in the damper performs a vertical motion, oil filled into the damper is moved into the energy recovery device through the tube, and the moved oil rotates wings of the turbine means to generate electric energy.

The energy recovery device disclosed in the prior art reference acts as an element that obstructs an original function of the suspension device.

In the prior art reference, since a difference occurs between an operation speed of the energy recovery device and an operation speed of the suspension device, shock cannot be smoothly absorbed on an under-construction road or an unpaved road from which a large bump is expected. That is, the energy recovery apparatus obstructs a shock absorbing operation that is an original function of the suspension device.

The stabilizer bar reduces a roll motion of a vehicle body. However, due to the energy recovery device, when the stabilizer bar is broken down or is late in convergence behavior, ride quality is degraded.

SUMMARY

Accordingly, the present invention provides an electric power generating apparatus using a suspension device, in which when a vehicle is driving on an under-construction road or an unpaved road from which a large bump is expected, by partially disconnecting a suspension device from an energy recovery device, a damping performance of the suspension device is prevented from being degraded due to a difference between a damping (attenuating) operation speed of the suspension device and an operation speed of the energy recovery device.

In one general aspect, an electronic power generating apparatus, which uses a suspension device converting kinetic energy into electric energy and includes a turbine unit that is supplied with fluid from the suspension device to generate the kinetic energy, includes: a damper disposed on a wheel shaft of a vehicle, wherein the damper includes a cylinder that is filled with fluid for absorbing shock applied to the vehicle when the vehicle is driving and a piston that moves in an up and down direction along an inside of the cylinder; a valve disposed on a side surface of the cylinder, wherein the valve includes a body that includes a nozzle disposed at one end of the body for supplying the fluid filled into the cylinder to the turbine unit through a fluid movement tube, a needle that rectilinearly moves inside the body to control an opening or closing degree of the nozzle, and an electromagnet that is disposed on an outer surface of the body and is magnetized by a current applied thereto to generate a magnetic force for controlling a rectilinear motion of the needle; and a valve controller configured to sense an amount of the shock when the vehicle is driving, and apply the current, corresponding to the sensed amount of the shock, to the electromagnet.

In another general aspect, an electronic power generating apparatus, which uses a suspension device converting kinetic energy into electric energy and includes a turbine unit that is supplied with fluid from the suspension device to generate the kinetic energy, includes: a damper disposed on a wheel shaft of a vehicle, wherein the damper includes a cylinder that is filled with fluid for absorbing shock applied to the vehicle when the vehicle is driving and a piston that moves in an up and down direction along an inside of the cylinder; a valve configured to include a body that includes a nozzle disposed at one end of the body, a needle that rectilinearly moves inside the body to control an opening or closing degree of the nozzle, and a screw-nut pair that controls a rectilinear motion of the needle according to a motor driving force; and a valve controller configured to sense an amount of the shock when the vehicle is driving, and apply the current, corresponding to the sensed amount of the shock, to the electromagnet.

Other features and aspects will be apparent from the following detailed description, the drawings, and the claims.

BRIEF DESCRIPTION OF THE DRAWINGS

FIGS. 2A and 2B are diagrams illustrating in detail a connection structure between a damper and a turbine unit among some elements of the electric power generating apparatus using the suspension device illustrated in FIG. 1.

FIGS. 5A and 5B are diagrams illustrating a flow of fluid in a damping operation mode and an energy recovery operation mode according to an embodiment of the present invention.

DETAILED DESCRIPTION OF EMBODIMENTS

In an electric power generating apparatus using a suspension device according to an embodiment of the present invention, provided is a valve structure for partially disconnecting a suspension device (or a damper) from an energy recovery device (or a turbine unit) when a vehicle is driving on an under-construction road or an unpaved road from which a large bump is expected.

The valve structure according to an embodiment of the present invention solves a problem where when a vehicle is driving on an under-construction road or an unpaved road, a performance of a shock absorbing function that is an original function of the suspension device is reduced due to a difference between a damping (attenuating) operation speed of the suspension device and an operation speed of the energy recovery device.

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

The terms used herein are for the purpose of describing particular embodiments only and are not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, embodiments of the present invention will be described in detail with reference to the accompanying drawings.

Figure 1:
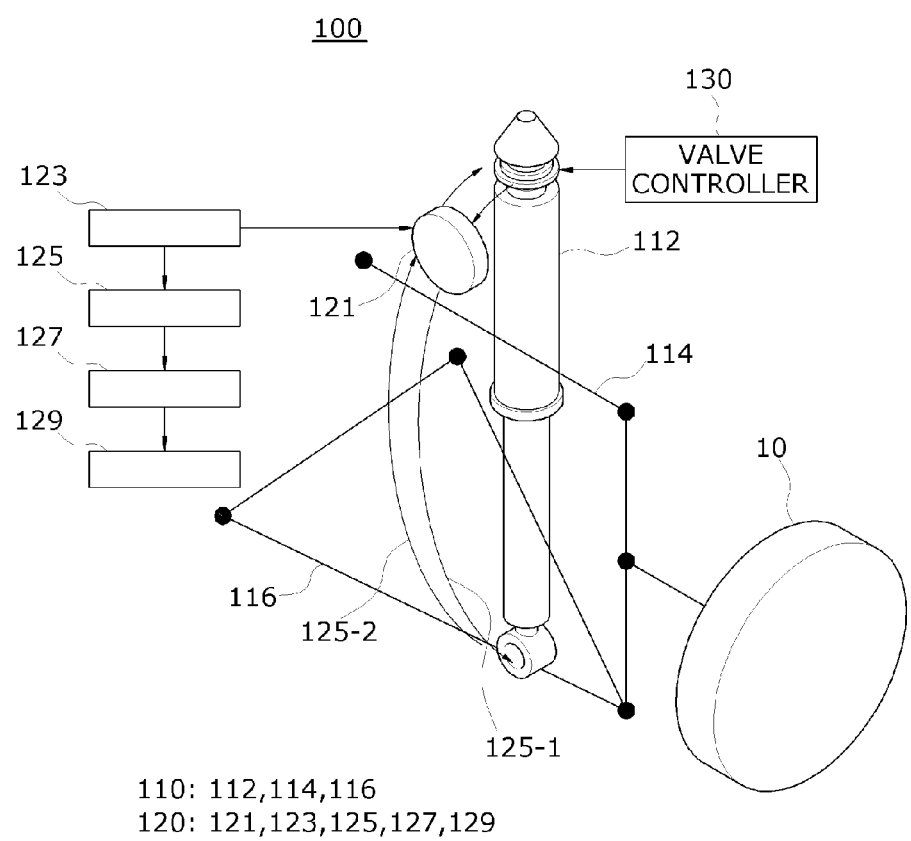
FIG. 1 is a perspective view schematically illustrating a whole configuration of an electric power generating apparatus using a suspension device according to an embodiment of the present invention.

FIG. 1 is a perspective view schematically illustrating a configuration of an electric power generating apparatus 100 connected to a suspension device according to an embodiment of the present invention.

Referring to FIG. 1, the electric power generating apparatus according to an embodiment of the present invention may include a suspension device 110, an energy recovery device 120, and a valve controller 130.

Suspension Device 10

The suspension device 110 may include a damper 112, an upper arm 114, and a lower arm 116.

The damper 112 may be installed on a wheel shaft of a vehicle. When the vehicle is driving, the damper 112 may absorb shock which is applied to the vehicle due to a road surface state. The damper 112 will be described in detail with reference to FIG. 2.

The upper arm 114 may be an arm that is laterally installed at an upper portion. One end of the upper arm 114 may be connected to a vehicle body (not shown), and the other end of the upper arm 114 may be connected to one end of a steering knuckle 18 by an upper ball joint 14 and/or the like to absorb shock and vibration which are caused by a road surface.

The lower arm 116 may be an arm that is installed under the upper arm 114. One end of the lower arm 116 may be connected to the vehicle body (not shown), and the other end of the lower arm 116 may be connected to the other end of the steering knuckle 18 by a lower ball joint 16 and/or the like to absorb shock and vibration which are caused by a road surface when the vehicle is driving.

Energy Recovery Device 120

The energy recovery device 120 may include a turbine unit 121, a amplifier 123, an energy converter 125, a storage unit 127, a battery 129, and a valve controller 130.

The turbine unit 121 may be connected to the damper 112 through a lowering fluid movement tube 125-1 and a raising fluid movement tube 125-2 to generate kinetic energy according to fluid moving from the damper 112.

The amplifier 123 may be an element that amplifies the kinetic energy generated by the turbine unit 121. The amplifier 123 may be configured in a gear type or a belt pulley type.

The energy converter 125 may convert the kinetic energy, amplified by the amplifier 123, into electric energy. Here, the energy converter 125 may be an alternating current (AC) generator.

The storage unit 127 may store the electric energy obtained through conversion by the energy converter 125.

The battery 129 may be charged with the electric energy stored in the storage unit 127.

The valve controller 130 may be an element that controls opening or closing of a valve (shown in FIG. 2) included in the damper 112. When the vehicle is driving, the valve controller 130 may sense the amount of shock which is applied to the vehicle due to a road surface state, and may control an opening or closing degree of the valve according to a magnetic force or a mechanical power corresponding to the sensed amount of shock. This will be described in detail with reference to FIG. 2.

FIGS. 2A and 2B are diagrams illustrating in detail a connection structure between the damper and the turbine unit among some elements of the electric power generating apparatus using the suspension device illustrated in FIG. 1.

Referring to FIGS. 2A and 2B, the damper 112 may include a cylinder 112-1 and a piston 112-2.

The cylinder 112-1 may be installed on the wheel shaft of the vehicle. Fluid for shock applied to the vehicle when the vehicle is driving may be filled into the cylinder 112-1.

The piston 112-2 may move in an up and down direction along the inside of the cylinder 112-1.

A plurality of valves 112A to 112D that supply the fluid, filled into the cylinder 112-1, to the turbine unit 121 may be provided on a side surface of the cylinder 112-1.

The plurality of valves 112A to 112D may include a plurality of upper valves 112A and 112B and a plurality of lower valves 112C and 112D.

The plurality of upper valves 112A and 112B may include an upper discharge valve 112A and an upper suction valve 112B. The plurality of lower valves 112C and 112D may include a lower discharge valve 112C and a lower suction valve 112D.

The upper discharge valve 112A may be connected to the lower suction valve 112D by the lowering fluid movement tube 125-1, and the upper suction valve 112B may be connected to the lower discharge valve 112C by the raising fluid movement tube 125-2.

The turbine unit 121 may be installed between the upper valves 112A and 112B and the lower valves 112C and 112D by the lowering fluid movement tube 125-1 and the raising fluid movement tube 125-2. The turbine unit 121 may include a turbine wheel 121B and a blade 121A attached to the turbine wheel 121B.

The turbine unit 121 may generate the kinetic energy by using a rotational force of the blade 121A which is rotated by fluid, which is filled into the cylinder 112-1 and is discharged through the upper discharge valve 112A when the piston 112-2 is raised as illustrated in FIG. 2A, and fluid which is filled into the cylinder 112-1 and is discharged through the lower discharge valve 112C when the piston 112-2 is lowered as illustrated in FIG. 2B.

According to an embodiment of the present invention, provided is a valve structure that partially disconnects the damper 112 from the turbine unit 121 when the vehicle is driving on an unpaved road or an under-construction road.

Therefore, the valve structure according to an embodiment of the present invention may be applied to the upper discharge valve 112A and the lower discharge valve 112C. In this case, the upper suction valve 112B and the lower suction valve 112D may each be configured with a check valve that is opened in one direction and prevents a reverse flow of fluid.

Hereinafter, a structure of each of the upper discharge valve 112A and the lower discharge valve 112C will be described in detail. The upper discharge valve 112A and the lower discharge valve 112C may have the same configuration and function, and thus, only the structure of the upper discharge valve 112A will be described below. A description of the structure of the upper discharge valve 112A may be applied to the structure of the lower discharge valve 112C.

Moreover, hereinafter, two embodiments of the structure of the upper discharge valve 112A will be disclosed. The upper discharge valve 112A according to a first embodiment will be described with reference to FIG. 3, and then, the upper discharge valve 112A according to a second embodiment will be described with reference to FIG. 4. In the first and second embodiments, like reference numerals refer to like elements.

First Embodiment

Figure 3A:
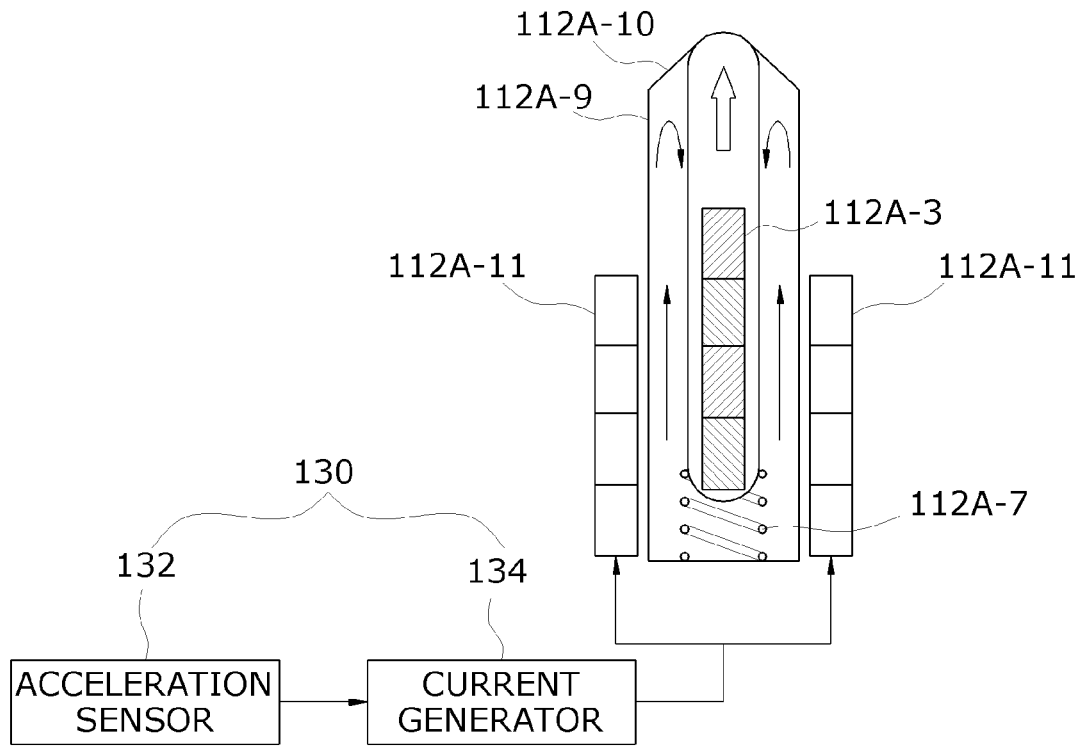
FIGS. 3A and 3B are diagrams illustrating a structure of an upper discharge valve according to a first embodiment of the present invention.
Figure 3B:
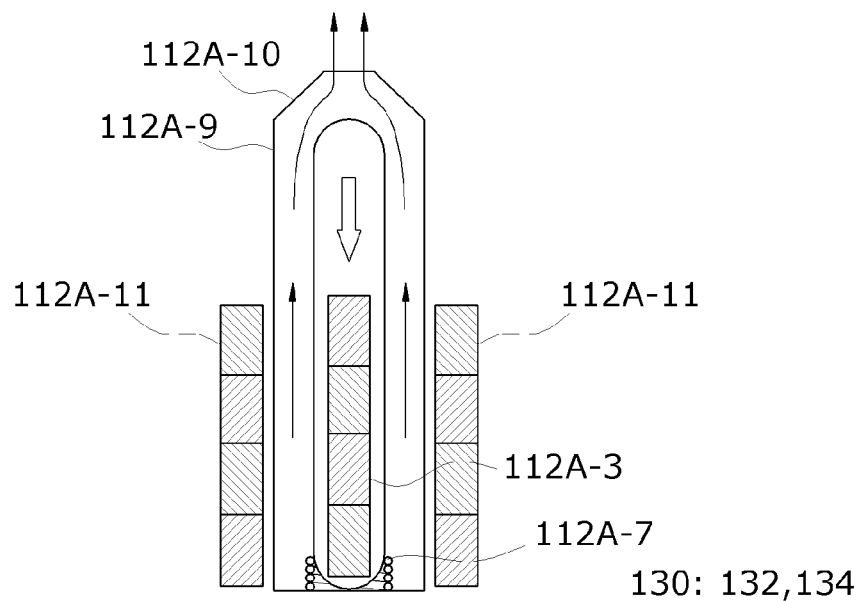

FIGS. 3A and 3B are diagrams illustrating a cross-sectional structure of an upper discharge valve 112A according to a first embodiment of the present invention and an internal configuration of the valve controller 130 illustrated in FIG. 1. FIG. 3A illustrates a state where the upper discharge valve 112A is closed, and FIG. 3B illustrates a state where the upper discharge valve 112A is opened.

Referring to FIGS. 3A and 3B, the upper discharge valve 112A according to the first embodiment of the present invention may disconnect the damper 112 from the turbine unit 121 according to an opening/closing control method using an electromagnet.

In detail, the upper discharge valve 112A according to the first embodiment of the present invention may include a body 112A-9 including a nozzle 112A-10 disposed on one end of the body 112A-9, a needle 112A-1 that moves inside the body 112A-9, a spring member 112A-7 that pushes the needle 112A-1 in a direction toward the nozzle 112A-10, and an electromagnet 112A-11 that is disposed on an outer surface of the body 112A-9.

The needle 112A-1 may move inside the body 112A-9 according to a magnetic force applied from the electromagnet 112A-11 to control an opening/closing degree of the nozzle 112A-10.

A permanent magnet 112A-3 may be built into the needle 112A-1, for moving inside the body 112A-9 according to the magnetic force. That is, the needle 112A-1 may move inside the body 112A-9 with a force acting on between a magnetic force of the permanent magnet 112A-3 and the magnetic force generated by the electromagnet 112A-11.

The electromagnet 112A-11 may generate the magnetic force with a current applied from the valve controller 130.

When the vehicle is driving, the valve controller 130 may sense the amount of shock which is applied to the vehicle due to a road surface state, and may generate a current corresponding to the sensed amount of shock to apply the generated current to the electromagnet 112A-11.

The valve controller 130 may include an acceleration sensor 132 and a current generator 134, for applying the current to the electromagnet 112A-11.

The acceleration sensor 132 may sense the amount of shock which is applied to the vehicle due to the road surface state. Here, when a road surface is assumed as a plane having an X axis and a Y axis, the amount of shock may be defined as a change amount of a force applied in a Z-axis direction that is a direction vertical to the road surface.

The current generator 134 may generate a current according to the amount of shock sensed by the acceleration sensor 132.

In the first embodiment, the current generator 134 may generate a current having a current value which is inversely proportional to a difference value between the sensed amount of shock and a reference shock amount. When the difference value is equal to or greater than a threshold value, the current generator 134 may stop an operation of generating of the current.

According to the first embodiment, as illustrated in FIG. 3B, while the vehicle is driving on a road having a good road surface, the electromagnet 112A-11 fixed to an outer surface of the body 112A-10 may be magnetized by the current generated by the current generator 134 to generate the magnetic force. In FIG. 3B, a hatching pattern may be illustrated on the electromagnet 112A-11, for showing a magnetized state of the electromagnet 112A-11. In this case, a hatching direction illustrated on the electromagnet 112A-11 may be illustrated different from a hatching direction illustrated on the permanent magnet 112A-3. This illustrates that a polarity of the electromagnet 112A-11 is opposite to that of the permanent magnet 112A-3.

The needle 112A-1 may be moved toward the spring member 112A-7 by a force (an attractive force) acting on between the magnetic force generated by the electromagnet 112A-11 and the magnetic force of the permanent magnet 112A-3 built into the needle 112A-1. That is, while the vehicle is driving on a road having a good road surface, the nozzle 112A-10 may maintain an opened state.

In the opened state, when the vehicle enters an unpaved road or an under-construction road, the acceleration sensor 132 may sense the amount of shock applied to the vehicle. In this case, when the sensed amount of shock is greater than the reference shock amount, the current generator 134 may stop the supply of the current to the electromagnet 112A-11.

The electromagnet 112A-11 which is not supplied with the current from the current generator 134 may lose the magnetic force, and moreover, the force acting on between the electromagnet 112A-11 and the needle 112A-1 may dissipate.

Therefore, as illustrated in FIG. 3A, the needle 112A-1 may be moved toward the nozzle 112A-10 by a pushing force (an elastic restoring force or an intensity of elasticity)

of the spring member 112A-7, and the nozzle 112A-10 may maintain a closed state due to the needle 112A-1.

As described above, when the vehicle enters an unpaved road or an under-construction road, as illustrated in FIG. 3A, the nozzle 112A-10 may be closed, and thus, the damper 112 may be disconnected from the turbine unit 121. Therefore, the damper 112 smoothly (or faithfully) performs a damping function (a buffering function) that is the original function thereof.

By incrementally adjusting a closing degree of the nozzle 112A-10 by the needle 112A-1, an energy recovery operation may be performed without degrading a performance of the damping function. The energy recovery operation may be performed by the current generator 134 applying an incrementally adjusted current to the electromagnet 112A-11.

Second Embodiment

Figure 4A:
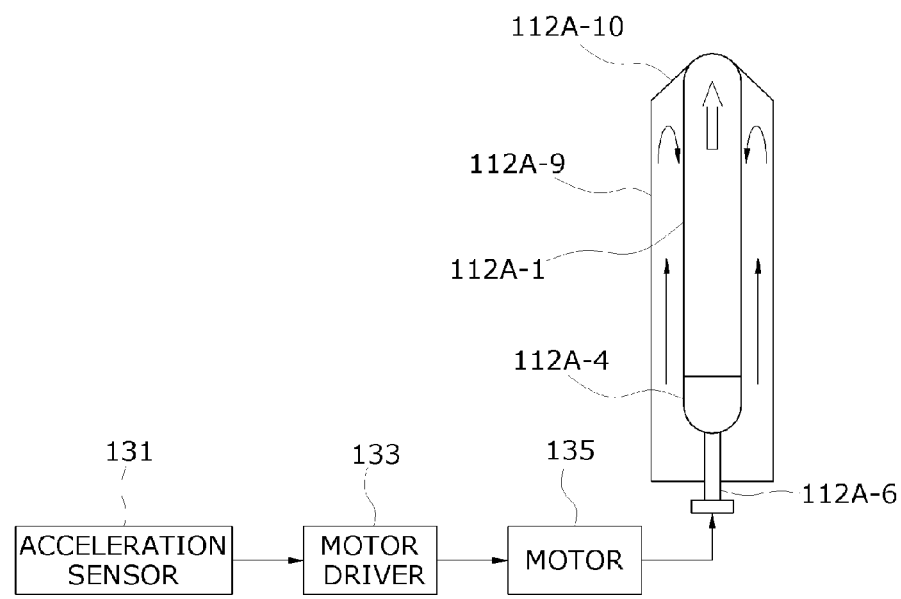
FIGS. 4A and 4B are diagrams illustrating a structure of an upper discharge valve according to a second embodiment of the present invention.
Figure 4B:
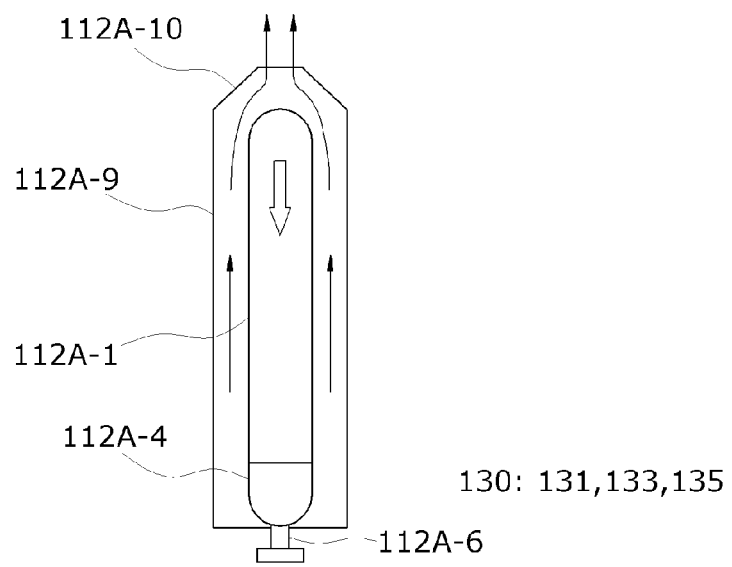

FIGS. 4A and 4B are diagrams illustrating a cross-sectional structure of an upper discharge valve 112A according to a second embodiment of the present invention and an internal configuration of the valve controller 130 illustrated in FIG. 1. FIG. 4A illustrates a state where the upper discharge valve 112A is closed, and FIG. 4B illustrates a state where the upper discharge valve 112A is opened.

Referring to FIGS. 4A and 4B, the upper discharge valve 112A according to the second embodiment of the present invention may have a difference with the first embodiment in that the upper discharge valve 112A according to the second embodiment is configured to disconnect the damper 112 from the turbine unit 121 according to an opening/closing control method using a screw-nut pair.

In detail, the upper discharge valve 112A according to the second embodiment may include a body 112A-9 including a nozzle 112A-10 disposed at one end of the body 112A-9, a needle 112A-1 that rectilinearly moves inside the body 112A-9 to control an opening/closing degree of the nozzle 112A-10, and a screw-needle pair 112A-4 and 112A-6 that controls a rectilinear motion of the needle 112A-10 according to a motor driving force. The screw-needle pair 112A-4 and 112A-6 may include a nut 112A-4 coupled to an end of the needle 112A-1 and a screw member 112A-6 screw-coupled to the nut 112A-4.

When the vehicle is driving, the valve controller 130 according to the second embodiment may sense the amount of shock which is applied to the vehicle due to a road surface state, and may apply the motor driving force, corresponding to the sensed amount of shock, to the screw-needle pair 112A-4 and 112A-6.

In detail, the valve controller 130 according to the second embodiment may include an acceleration sensor 131 that senses the amount of shock which is applied to the vehicle due to the road surface state, a motor driver 133 that generates one of a first motor driving current and a second motor driving current according to the sensed amount of shock, and a motor 135 that outputs a motor driving force according to the one motor driving current.

Although not shown in FIGS. 4A and 4B, a male screw may be provided on an outer circumference of the screw member 112A-6, and a female screw may be provided on an inner circumference of the nut 112A-4. The screw member 112A-6 may be coupled to the nut 112A-6 in a screw combination structure.

A rotational motion of the screw member 112A-6 that rotates according to the motor driving force may be converted into a rectilinear motion of the nut 112A-4 screw-coupled to the screw member 112A-6, based on the screw combination structure.

The needle 112A-1 fixing-coupled to the nut 112A-4 may rectilinearly move inside the body 112A-9 according to a rectilinear motion of the nut 112A-4 to control an opening/closing degree of the nozzle 112A-10.

As described above, according to the second embodiment of the present invention, the upper discharge valve 112A may control the opening/closing degree of the nozzle 112A-10, based on a mechanical power that includes the motor driving force, the rectilinear motion of the screw member 112A-6, and the rectilinear motion of the nut 112A-4.

When the sensed amount of shock is equal to or greater than a reference shock amount, the motor driver 133 may generate the first motor driving current that moves the needle 112A-1 toward the nozzle 112A-10. When the sensed amount of shock is less than the reference shock amount, the motor driver 133 may generate the second motor driving current that moves the needle 112A-1 in a direction deviating from the nozzle 112A-10. The first motor driving current and the second motor driving current may have different phases.

According to the second embodiment, when the vehicle enters an unpaved road or an under-construction road, the upper discharge valve 112A may partially disconnect the damper 112 from the turbine unit 121 by using the mechanical power based on the amount of shock applied to the vehicle.

FIGS. 5A and 5B are diagrams illustrating a flow of fluid in a damping operation mode and an energy recovery operation mode according to an embodiment of the present invention. FIG. 5A illustrates a flow of fluid in the energy recovery operation mode, and FIG. 5B illustrates a flow of fluid in the damping operation mode.

Referring to FIG. 5A, in the energy recovery operation mode, the upper or lower discharge valve 112A or 112C may be opened by a magnetic force or the mechanical power, and thus, a fluid moving line passing through the turbine unit 121 may be formed, whereby an energy recovery operation may be performed.

On the other hand, referring to FIG. 5A, in the damping operation mode, the upper or lower discharge valve 112A or 112C may be closed by the magnetic force or the mechanical power, and thus, fluid may move through an orifice of the piston 112-2, whereby a damping force (an attenuating force) may be adjusted different from the energy recovery operation mode. Accordingly, the original function of the damper is faithfully performed.

As described above, in the embodiments of the present invention, a rotation speed of the blade in the turbine unit 121 may be adjusted by appropriately adjusting the upper or lower discharge valve 112A or 112C with the magnetic force or the mechanical power, and thus, the damping force of the damper 112 may be variously set depending on a road surface state.

The related art damper for recovering energy backward drives an energy recover device to convert internal pressure of the damper. However, in the embodiments of the present invention, energy recovery and a performance change of the damper are simultaneously realized by adjusting a flow rate of fluid of the upper or lower discharge valve 112A or 112C.

As described above, according to the embodiments of the present invention, when a vehicle is driving on an under-construction road or an unpaved road from which a large bump is expected, by adaptively adjusting (or blocking) a flow rate of fluid which moves from the suspension device to the energy recovery device, the original function of the suspension device is normally performed independent from an operation of the energy recovery device.

Moreover, according to the embodiments of the present invention, by using a compression and expansion motion of a conventional damper, the energy recovery device recovers energy which is dissipated by absorbing shock, thereby enhancing a fuel efficiency of a vehicle.

Moreover, according to the embodiments of the present invention, a valve for adjusting a flow rate of fluid enables the energy recovery device to rotate faster, thereby further increasing an energy recovery rate.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An electronic power generating apparatus using a suspension device to convert kinetic energy into electric energy, the electronic power generating apparatus comprising:
   a turbine supplied with fluid from the suspension device to generate the kinetic energy;
   a damper disposed on a wheel shaft of a vehicle, the damper comprising a cylinder filled with fluid to absorb shock applied to the vehicle while the vehicle is driving and a piston configured to reciprocate along an inside of the cylinder;
   a valve disposed on a side surface of the cylinder, the valve comprising:
      a body comprising a nozzle disposed at one end of the body to supply the fluid filled into the cylinder to the turbine through a fluid movement tube;
      a needle configured to move inside the body to control an opening or closing degree of the nozzle; and
      an electromagnet disposed on an outer surface of the body and configured to be magnetized by a current applied to the electromagnet to generate a magnetic force to control the movement of the needle; and
   a valve controller configured to apply the current to the electromagnet, the valve controller comprising:
      an acceleration sensor configured to sense an amount of the shock applied to the vehicle based on a road surface state; and
      a current generator configured to generate the current to have a current value that is inversely proportional to a difference value between the sensed amount of the shock and a reference shock amount.

2. The apparatus of claim 1, further comprising a permanent magnet built into the needle.

3. The apparatus of claim 2, wherein the needle is configured to move inside the body based on the magnetic force generated by the electromagnet and a magnetic force exerted by the permanent magnet.

4. The apparatus of claim 1, wherein the valve controller is further configured to stop generating the current, in response to the difference value being greater than or equal to a threshold value.

5. The apparatus of claim 4, wherein:
   the valve further comprises a spring inside the body,
   the needle is configured to contract, in response to the nozzle being opened, and
   the spring is configured to push the needle toward the nozzle, in response the magnetic force being reduced.

6. An electronic power generating apparatus using a suspension device to convert kinetic energy into electric energy, the electronic power generating apparatus comprising:
   a turbine supplied with fluid from the suspension device to generate the kinetic energy;
   a damper disposed on a wheel shaft of a vehicle, the damper comprising a cylinder filled with fluid to absorb shock applied to the vehicle while the vehicle is driving and a piston configured to move in an up and down direction along an inside of the cylinder;
   a valve comprising:
      a body comprising a nozzle disposed at one end of the body;
      a needle configured to rectilinearly move inside the body to control an opening or closing degree of the nozzle; and
      a screw-nut pair configured to control a rectilinear motion of the needle according to a motor driving force;
   an acceleration sensor configured to sense an amount of the shock;
   a motor driver configured to sense the amount of the shock while the vehicle is driving, and to apply the current, corresponding to the sensed amount of the shock, to a motor, the motor driver being configured to:
      generate a motor driving current to move the needle toward the nozzle, in response to the sensed amount of the shock being equal to or greater than a reference shock amount; and
      generate the motor driving current to move the needle in a direction deviating from the nozzle, in response to the sensed amount of the shock being less than the reference shock amount; and
   a motor configured to apply the motor driving force to the screw-nut pair according to the motor driving current.

* * * * *